US012310362B1

(12) United States Patent
Denk et al.

(10) Patent No.: US 12,310,362 B1
(45) Date of Patent: May 27, 2025

(54) COMPOSITIONS AND METHODS FOR MINIMUM RISK PEST CONTROL

(71) Applicant: Discovery Purchaser Corporation, Wilmington, DE (US)

(72) Inventors: Kyle Denk, Cary, NC (US); Arunas Damijonaitis, Cary, NC (US); Deborah Koufas, Clayton, NC (US)

(73) Assignee: Discovery Purchaser Corporation, Wilmington, DE (US)

( * ) Notice: Subject to any disclaimer, the term of this patent is extended or adjusted under 35 U.S.C. 154(b) by 0 days.

(21) Appl. No.: 19/046,435

(22) Filed: Feb. 5, 2025

(51) Int. Cl.
| A01N 37/36 | (2006.01) |
| A01N 25/04 | (2006.01) |
| A01N 59/00 | (2006.01) |
| A01N 65/22 | (2009.01) |
| A01N 65/24 | (2009.01) |
| A01N 65/28 | (2009.01) |
| A01P 7/04 | (2006.01) |

(52) U.S. Cl.
CPC ............ *A01N 37/36* (2013.01); *A01N 25/04* (2013.01); *A01N 59/00* (2013.01); *A01N 65/22* (2013.01); *A01N 65/24* (2013.01); *A01N 65/28* (2013.01); *A01P 7/04* (2021.08)

(58) Field of Classification Search
None
See application file for complete search history.

(56) References Cited

U.S. PATENT DOCUMENTS

| 10,785,977 | B2 | 9/2020 | Vandock et al. | |
| 2016/0029625 | A1* | 2/2016 | Kennedy | A01N 35/04 |
| | | | | 514/465 |
| 2019/0274312 | A1 | 9/2019 | Bissinger et al. | |
| 2021/0186009 | A1 | 6/2021 | Ko et al. | |
| 2024/0324606 | A1* | 10/2024 | Harraca | A01N 31/02 |

OTHER PUBLICATIONS

Essential Botanical Insecticide Product Label with Active Ingredients; Mosquito Squad. 20240606a.

* cited by examiner

*Primary Examiner* — John Pak
(74) *Attorney, Agent, or Firm* — Maynard Nexsen PC

(57) ABSTRACT

In one aspect, compositions or formulations for insect control are described herein. In some embodiments, a composition or formulation described herein comprises an essential oil component, an Acetyl Tributyl Citrate component, and amorphous precipitated silica component.

20 Claims, No Drawings

COMPOSITIONS AND METHODS FOR MINIMUM RISK PEST CONTROL

FIELD

The technology described herein generally relates to compositions and methods for low risk or environmentally friendly pest control, and more particularly to compositions comprising an essential oil and/or biorational.

BACKGROUND

As consumers look for alternatives to conventional pesticides which can contain toxic components, a category of pesticides products considered to be low or minimum risk pesticides is gaining popularity. The United States Environmental Protection Agency (EPA) has exempted such minimum risk pesticides from registration so long as they comply with the regulations in 40 C.F.R. § 152.25. Chemical products containing active and inert ingredients considered minimum risk are registered under Section 25(b) of FIFRA the Federal Insecticide, Fungicide Rodenticide Act (FIFRA), and can be referred to as a FIFRA 25(b), or 25(b) chemical or pesticide.

A 25(b) pesticide, or insecticide, that can be exempted from federal registration generally must meet certain criteria, for example use approved active and inert ingredients and follow labeling guidelines.

Conventional formulations in this low or minimum risk chemical or pesticide space typically have very high amounts of active ingredients, such as essential oils, required to achieve desired efficacy, and therefore rely heavily on essential oil content to control insects, such as mosquitos. Additionally, conventional essential oil concentrates and spray dilutions are not stable for extended periods of time and there is separation between aqueous and oils phases and volatilization of essential oil constituents, and also the oil phases generally separate quickly when diluted which can reduce efficacy and give uneven coverage. Further, 25(b) compliant formulations having high essential oil concentrations can have hazardous characteristics, as exemplified in many of the safety data sheets of these formulations, as essential oils can necessitate safety considerations when used in high amounts.

In contrast to conventional chemicals, compositions, and/or formulations, the technology described herein provides for a composition or formulation that can be in compliance with the regulations of 25(b) and can successfully be utilized as a pest control, for example insect control, within the design space of 25(b) pesticides, and further provides improved and/or reliable performance, stability, and safety characteristics.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the technology described herein are generally directed towards essential oil based compositions that are formed as emulsified oils in a continuous aqueous phase that are suitable for spraying or for dilution with water to form a sprayable preparation. In some aspects, compositions and formulations described herein can achieve up to 100% morality against insects.

In one aspect, a composition or formulation is provided comprising an essential oil component, an Acetyl Tributyl Citrate (ATC) component, and an amorphous precipitated silica component. In some instances, the essential oil component can be present in the composition in an amount of 0.1-10 wt. %, based on the total weight of the composition. In some instances, the ATC component can be present in an amount of 1-15 wt. %, based on the total weight of the composition. In some instances, the amorphous precipitated silica component can be present in the composition in an amount of 1-10 wt. %, based on the total weight of the composition. In some instances, the essential oil component can comprise one or more of cinnamon oil, clove oil, thyme oil, and/or sesame oil. In some instances, the composition can comprise an additional solvent additive component, for example butyl lactate and/or isopropyl myristate. In some further aspects, a composition can comprise one or more of an aqueous continuous phase, a buffer, a rheology modifier, an emulsifier, a glycerin, among other components.

In another aspect, methods of use, for instance a method for controlling or eradicating insects is provided. In some instances, a method comprises providing a composition or formulation comprising an essential oil component, an Acetyl Tributyl Citrate (ATC) component, and an amorphous precipitated silica component, and administering or applying the composition to an area containing insects. In some instances, a method includes diluting the composition. In some aspects, greater than 90% and/or up to 100% efficacy, e.g. mortality rate against insects, can be achieved at a time after the administering is carried out.

These and other embodiments are described in greater detail in the detailed description which follows.

DETAILED DESCRIPTION

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different elements, steps, or combinations of steps and/or elements similar to the ones described in this document, in conjunction with other present or future technologies. Moreover, although the terms "step" can be used herein to connote different elements of methods employed, the terms should not be interpreted as implying any particular order among or between various steps disclosed herein unless and except when the order of individual steps is explicitly described.

Embodiments described herein can be understood more readily by reference to the following detailed description, examples, claims, and figures. Elements, systems, apparatus and methods described herein, however, are not limited to the specific embodiments presented in the detailed description, examples, claims, and figures. It should be recognized that these embodiments are merely illustrative of the principles of the present invention. Numerous modifications and adaptations will be readily apparent to those of skill in the art without departing from the scope of the invention. Accordingly, this disclosure is not intended to embrace all such alternatives, modifications and variations that fall within the scope of the technology.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, 1 to 4, 3 to 7, 4.7 to 10.0, 3.6 to 7.9, or 5 to 8.

All ranges disclosed herein are also to be considered to include the end points of the range, unless expressly stated otherwise. For example, a range of "between 5 and 10," "from 5 to 10," or "5-10" should generally be considered to include the end points 5 and 10.

Additionally, in any disclosed embodiment, the terms "substantially," "approximately," and "about" may be substituted with "within [a percentage] of" what is specified, where the percentage includes 0.1, 1, 5, and 10 percent.

Further, when the phrase "up to" is used in connection with an amount or quantity, it is to be understood that the amount is at least a detectable amount or quantity (that is, the amount is a non-zero amount). For example, a material present in an amount "up to" a specified amount can be present from a detectable (or non-zero) amount and up to and including the specified amount. In some other aspects, for example, an amount "up to" includes a lower amount of about 0.1.

It is also to be understood that the article "a" or "an" refers to "at least one," unless the context of a particular use requires otherwise.

At a high level, aspects of the present technology generally relate to compositions and methods of use for low risk and/or environmentally friendly pest control. In some embodiments, a composition described herein comprises an essential oil-based formulation, that in some instances, can be formulated to be suitable for spraying and/or for dilution with water to form a spray or sprayable preparation. In some aspects, a composition and/or formulation described herein is suitable for use in pest control, more particularly, insect control. In some aspects, compositions or formulations described herein have a high efficacy against pests, such as insects. In some aspects, compositions or formulations described herein have long lasting stability.

In some other aspects, the technology described herein generally relates to essential oil based compositions or formulations suitable for spraying or for dilution with water to form a sprayable preparation to control insects.

As will be appreciated, known pesticides which rely on high rates or amounts of active ingredients, such as essential oils, or high rates or amounts of solvent, are accompanied by chemistries that cannot be considered low risk in compliance with the 25(b) space requirements.

Aspects of the present technology provide for compositions and/or formulations that utilize lower or low rates of components, and in some embodiments comprise essential oil(s) and/or biorational(s), amorphous silica (e.g. synthetic, precipitated), a surfactant or solvent (e.g. Acetyl Tributyl Citrate) and in some instances, other 25(b) compliant components or chemistries in a liquid or aqueous concentrate form.

In some aspects, a composition or formulation described herein can be formulated as an emulsion (EW) such as an oil-in water and water-in-oil emulsion, for example an emulsified oil in a continuous aqueous phase. In some aspects, a composition or formulation can be an essential oil formulation as an EW, or low loading EW. In some aspects, a composition or formulation described herein can be formed as a dilutable concentrate (DC). In some embodiments, a composition described herein comprises an essential oil, Acetyl Tributyl Citrate (ATC), and silica. In some aspects, the silica component can be amorphous precipitated silica. In some other aspects, a composition or formulation described herein can be formed as an emulsifiable concentrate (EC), dust powder (DP), or any other adjacent formulation. As will be appreciated, the various formulation types can be achieved through adjustments to various components in a composition or formulation described herein, as would be understood by one of skill in the art.

Without intending to be bound by theory, an EW formulation described herein can use silica (e.g. amorphous precipitated silica) to embed an ATC component, which can also function as a carrier solvent for an essential oil component. Other components that can be included in the formulation, and described herein, can stabilize the suspension of the silica and emulsification of the oils. Accordingly, a long-term, water-based, stable concentrate can be created or formed, that is also a low-risk formulation, as compared to conventional solvent-based concentrates or formulations. Additionally, after dilution (e.g. with water), a composition or formulation described herein can exhibit long-term homogeneity. Furthermore, in some aspects, a composition or formulation described herein can have unexpectedly high efficacy against insects, for example mosquitos, while having a low active ingredient content or low essential oil content. Accordingly, compositions or formulations described herein can reduce or utilize less of an amount of one or more active ingredients (e.g. essential oils, biorationals, among others) that is needed to effectively control pests, such as insects.

In some aspects, compositions or formulations for use as pesticides are described herein. In some embodiments, a composition comprises an active essential oil, a solvent, and an emulsifier. In one aspect a composition or formulation comprises an essential oil (EO), a solvent (e.g. ATC), a synergist, and a carrier (e.g. silica gel) which can be formed into an aqueous-based formulation. In some aspects, a composition or formulation can be diluted and formed into a spray dilution.

In some aspects, as will be appreciated, emulsification of the ATC oil can be achieved through embedding silica in the composition or formulation. In some aspects, the silica can act as a carrier vessel for various components of the composition or formulation, such as ATC, a synergist, and one or more essential oils. In some aspects, the combination of the components in a composition or formulation described herein on a silica carrier (which can also function as a desiccant in the composition or formulation) create a high performing and stable composition or formulation. In some aspects, the size of a silica carrier can be modified or tuned to provide different workability characteristics for an overall solution. In some instances, a silica carrier can be nanosized, for example silica nanoparticles can have an average size from 1-100 nanometers (nm). In some instances the silica carrier can be microsized, for example silica microparticles can have an average size from 1-100 micrometers (μm). Without intending to be bound by theory, nanosized silica particles are able to be embedded and carried by micrometer sized droplets in a spray, thereby enabling the composition or formulation to travel farther (as compared to microsized silica particles) when used, for example when sprayed.

I. Compositions or Formulations for Insect Control

According to aspects of the present technology, compositions or formulations for insect control are provided. In some aspects, a composition or formulation solution can achieve an efficacy of up to 100% mortality against insects (e.g. mosquitos) when sprayed at a given dilution rate, for example 2 oz/gal, 4 oz/gal, 8 oz/gal. In some aspects, as will be appreciated, the result of essential oil(s) (EO) that are applied by a composition or formulation described herein can be 2.5x-9x lower than conventional compositions or formulations. Accordingly, compositions or formulations described herein demonstrate an improved formulation that achieves equivalent or better efficacy against insects with 2.5x-9x less active ingredient(s) as compared to conventional compositions or formulations. In some embodiments, a composition or formulation described herein does not exhibit any phase separation.

In one aspect, compositions or formulations, including dilutable compositions, for use as a pesticide and/or insecticide are described herein. In some aspects, compositions, formulations, and/or dilutable compositions described herein can be employed for use against insects, for example, mosquitos, flies, and other pests, including, but not limited to, cockroaches, bedbugs, sand flies, and reduviidae. Additional examples of pests that may be controlled by compositions, formulations, and/or dilutable compositions described herein include, but are not limited to, stored product pests, rural hygiene pests, or in some instances, turf, ornamental, and/or greenhouse pests. As will be appreciated, in some aspects, compositions, formulations, and/or dilutable compositions described herein are not specifically lethal to some other insects, for example insects from the order Hymenoptera. In some example embodiments, compositions, formulations, and/or dilutable compositions described herein are specifically lethal to mosquitos, but sub-lethal to any number of other insects.

In some embodiments, a composition or formulation comprises an essential oil (or plurality of essential oils), a solvent, and silica. In some instances, the solvent is Acetyl Tributyl Citrate (ATC). In some instances, the silica is amorphous precipitated silica. Additionally, in some instances, a composition or formulation can further comprise an additional solvent or additive. Without intending to be bound by theory, in some aspects the ATC can serve as a volatility reducer and can be the main carrier phase for one or more essential oils. In some instances, the essential oils can be the active ingredients. In some further instances, the silica, or amorphous silica, can serve as a carrier particle, emulsifier (e.g. via pickering emulsion), and desiccant in the composition or formulation. Other components may also be present in some embodiments of compositions described herein.

Turning now in more detail to specific components of compositions described herein, a composition described herein comprises an essential oil. The essential oil can comprise any essential oil not inconsistent with the technical objectives of the present disclosure. It is to be understood that an essential oil component can comprise one or more essential oils. In some cases, for instance, an essential oil comprises clove oil, thyme oil, cinnamon oil, sesame oil, or a combination comprising any of the forgoing. In some instances, an essential oil additionally comprises geraniol, lemongrass oil, castor oil, cedarwood oil, corn oil, cornmint oil, rosemary oil, soybean oil, citronella oil, 2-Phenyl Ethyl Propionate, amongst other essential oils.

In some instances, a composition described herein comprises an active ingredient comprising a biorational or other naturally derived component, for example a component isolated from one or more essential oils. For example, is some instances, a composition or formulation can additionally or alternatively comprise one or more of pyrethrum, spinosad, camphor, benzoic acid derivatives, amongst others.

In general, the essential oil and/or active ingredient component of a composition or formulation described herein can be present in the composition in any amount not inconsistent with the technical objectives of the present disclosure. In some embodiments, for example, the essential oil component or in some instances active ingredient component is present in an amount or concentration of 0.5-10 wt. %, or 0.5-5 wt. %, based on the total weight of the composition. In some instances, the essential oil and/or active ingredient component is present in an amount of 1-15 wt. %, 1-10 wt. %, 1-6 wt. %, 1-5 wt. %, 1-4 wt. %, 1-3 wt. %, 1-2 wt. %, up to 1 wt. %, up to 2 wt. %, up to 3 wt. %, up to 4 wt. %, up to 5 wt. %, up to 6 wt. %, up to 10 wt. % or up to 15 wt. %, based on the total weight of the composition. In some instances, the essential oil can be present in an amount of less than 15 wt. %, less than 10 wt. %, less than 6 wt. %, less than 5 wt. %, or less than 4 wt. %.

In some instances, a composition or formulation described herein comprises a plasticizer, film former, and/or solvent component. Any plasticizer, film former, and/or solvent not inconsistent with the technical objectives of the present disclosure may be used in a composition or formulation described herein. In some embodiments, the plasticizer, film former, and/or solvent comprises acetyl tributyl citrate (ATC). In some embodiments, the plasticizer, film former, and/or solvent comprises triethyl citrate. In some embodiments, a composition or formulation described herein comprises an additional solvent component additive, for example butyl lactate and/or isopropyl myristate, among others.

The plasticizer, film former, and/or solvent can be present in a composition described herein in any amount not inconsistent with the technical objectives of the present disclosure. In some embodiments, for example, the plasticizer, film former, and/or solvent can be present in an amount of 1-40 wt. %, 1-20 wt. %, 1-15 wt. %, 1-10 wt. %, or 5-10 wt. %, based on the total weight of the composition. In some embodiments, for example, the plasticizer, film former, and/or solvent can be present in an amount of up to 30 wt. %, up to 20 wt. %, up to 15 wt. %, up to 10 wt. %, or up to 5 wt. %, based on the total weight of the composition. In some embodiments, for example, the plasticizer, film former, and/or solvent can be present in an amount of less than 20 wt. %, less than 15 wt. %, less than 10 wt. %, or less than 5 wt. %, based on the total weight of the composition.

In some instances, a composition or formulation described herein comprises a surfactant, and/or emulsifier. Any surfactant and/or emulsifier not inconsistent with the technical objectives of the present disclosure may be used in a composition or formulation described herein. In some embodiments the surfactant and/or emulsifier comprises sodium lauryl sulfate (SLS), butyl lactate, decaglycerol mono, glyceryl monooleate, triglycerol monooleate, polyglyceryl oleate or a combination comprising any of the forgoing. In some embodiments, a composition or formulation described herein comprises an SLS component.

The surfactant and/or emulsifier can be present in a composition described herein in any amount not inconsistent with the technical objectives of the present disclosure. In some embodiments, for example, surfactant, and/or emulsifier can be present in an amount of 0.1-20 wt. %, 0.1-15 wt. %, 0.1-5 wt. %, 0.1-2 wt. %, or 0.1-1 wt. %, based on the total weight of the composition. In some embodiments, for example, surfactant, and/or emulsifier can be present in an amount of less than 20 wt. %, less than 15 wt. %, less than 10 wt. %, less than 5 wt. %, or less than 3 wt. %, based on the total weight of the composition. In some embodiments, for example, surfactant, and/or emulsifier can be present in an amount of up to 2 wt. %, up to 5 wt. %, up to 10 wt. %, up to 15 wt. %, or up to 20 wt. %, based on the total weight of the composition.

In some instances, a composition described herein comprises a carrier. Any carrier not inconsistent with the technical objectives of the present disclosure may be used in a composition or formulation described herein. In some embodiments the carrier comprises silica. Any silica-based carrier not inconsistent with the technical objectives of the present disclosure may be used. In some aspects, the silica is a silica gel (i.e. amorphous silica). In some aspects, the silica is a fumed silica. In some aspects, the silica is a precipitated silica, i.e. the silica gel or amorphous silica is a precipitated silica gel or precipitated amorphous silica. Accordingly, in some aspects, the carrier comprises a precipitated silica or a precipitated amorphous silica. Some non-limiting examples of commercially available precipitated silica useful in some embodiments described herein include the following: precipitated silica or silicate, commercially available from Evonik Industries under the trade names Sipernat®, Aerosil®, and Zeofree®, for example Sipernat® 380, Sipernat® 22S, and Aerosil® 200; a silica, synthetic amorphous silica, or mesoporous silica, commercially available from W.R. Grace & Co. under the trade names Syloid® and Perkasil®, for example Syloid® 244 and Perkasil® SM 660; a silica, commercially available from Solvay under the trade name Tixosil®, for example Tixosil® 38A; and an amorphous precipitated silica or precipitated silica, commercially available from PPG Industries under the trade name Hi-Sil®, for example Hi-Sil® 233. Other commercially available silica or precipitated and/or amorphous silica may also be used. In some aspects, as will be understood, the silica gel is crystalline-free. In some embodiments, an amorphous silica, such as a precipitated amorphous silica, can function at least as one of a carrier, rheology modifier, and/or a desiccant. In some embodiments, a composition or formulation described herein comprises a precipitated amorphous silica component.

The carrier can be present in a composition described herein in any amount not inconsistent with the technical objectives of the present disclosure. In some embodiments, for example, the carrier can be present in an amount of 0.1-20 wt. %, 1-15 wt. %, 1-10 wt. %, 1-5 wt. %, 1-2 wt. %, 5-10 wt. %, 4-9 wt. %, or 0.1-5 wt. %, based on the total weight of the composition. In some embodiments, the carrier can be present in an amount of up to 20 wt. %, up to 15 wt. %, up to 10 wt. %, or up to 5 wt. %, based on the total weight of the composition.

In some embodiments, a composition described herein comprises a buffer and/or preservative. Any buffer and/or preservative not inconsistent with the technical objectives of the present disclosure may be used in a composition or formulation described herein. In some instances, a buffer comprises citric acid. In some instances, a buffer and/or preservative comprises potassium sorbate and/or sodium benzoate.

In some embodiments, the buffer can be present in a composition described herein in any amount not inconsistent with the technical objectives of the present disclosure. In some embodiments, for example, the buffer can be present in an amount of 0.01-1 wt. %, 0.01-0.1 wt. %, or 0.02-0.06 wt. %, based on the total weight of the composition. In some embodiments, the buffer is present up to 1 wt. %, up to 0.1 wt. %, up to 0.06 wt. %, or up to 0.05 wt. %, based on the total weight of the composition. In some embodiments, the buffer is present in an amount of about 0.05 wt. %, based on the total weight of the composition.

In some embodiments, a buffer and/or preservative can be present in a composition described herein in any amount not inconsistent with the technical objectives of the present disclosure. In some embodiments, for example, the buffer and/or preservative can be present in an amount of 0.01-1 wt. %, 0.01-0.5 wt. %, or 0.01-0.1 wt. %, based on the total weight of the composition. In some embodiments, the buffer and/or preservative can be present in an amount of up to 1 wt. %, up to 0.5 wt. %, 0.1 wt. %, or up to 0.05 wt. %, based on the total weight of the composition. In some embodiments, a buffer and/or preservative is present at about 0.1 wt. %, based on the total weight of the composition. In some embodiments, a buffer and/or preservative is present at about 0.01 wt. %, based on the total weight of the composition.

In some embodiments, a composition described herein comprises an antifreeze agent. In some embodiments, an antifreeze agent comprises glycerin (glycerol). In addition providing antifreeze functionality to a composition or formulation, a glycerin component can further provide solvent/carrier functionality (e.g. dissolves active ingredients, creates stability in solution so as to prevent separation, and further provide more even distribution of active ingredients through the composition or formulation, or diluted composition). In some other aspects, a glycerin component can act as a surfactant enhancer (e.g. improving spreading of spray solution) or as a stabilizing agent (e.g. prevent degradation of active ingredients, maintain composition efficacy in storage, reduce and/or prevent crystallization). Any antifreeze agent not inconsistent with the technical objectives of the present disclosure may be used in a composition or formulation described herein.

In some embodiments, the antifreeze agent can be present in a composition described herein in any amount not inconsistent with the technical objectives of the present disclosure. In some embodiments, for example, the antifreeze agent can be present in an amount of 0.1 wt. %-10 wt. %, 1-5 wt. %, or 5-10 wt. %, based on the total weight of the composition. In some embodiments, the antifreeze agent is present at an amount up to 10 wt. %, based on the total weight of the composition.

In some embodiments, a composition described herein comprises a rheology modifier. Any rheology modifier not inconsistent with the technical objectives of the present disclosure may be used in a composition or formulation described herein. In some embodiments, the rheology modifier comprises xanthan gum. In some embodiments, the rheology modifier comprises one or more of guar gum, locust bean gum, agar agar, and pectin.

In some embodiments, the rheology modifier can be present in a composition described herein in any amount not inconsistent with the technical objectives of the present disclosure. In some embodiments, for example, the rheology modifier can be present in an amount of 0.1-1 wt. %, 0.1-0.5 wt. %, or 0.1-0.3 wt. %. In some embodiments, the rheology modifier can be present in an amount of about 0.2 wt. %. In some embodiments, the rheology modifier can be present in an amount of up to 0.5 wt. %, up to 0.3 wt. %, or up to 0.2 wt. %. In some embodiments, the rheology modifier can be present in an amount of less than 0.5 wt. %, or less than 0.3 wt. %.

In some embodiments, a composition described herein comprises a continuous phase. Any continuous phase component not inconsistent with the technical objectives of the present disclosure may be used in a composition or formulation described herein. In some embodiments, the continuous phase comprises water.

In some embodiments, the continuous phase can be present in a composition described herein in any amount not inconsistent with the technical objectives of the present disclosure. In some embodiments, for example, the continuous phase can be present in an amount of 50-90 wt. %, 60-80 wt. %, 70-80 wt. %, or 75-80 wt. %. In some embodiments, the continuous phase can be present in an amount of up to 90 wt. %, up to 80 wt. %, or up to 70 wt. %. In some embodiments, the continuous phase can be present in an amount of less than 90 wt. %, or less than 80 wt. %.

In some aspects, compositions and formulations described herein can have an efficacy against insects, for example mosquitos, of up to 70% mortality rate, of up to 80% mortality rate, of up to 90% mortality, or up to 100% mortality rate. In some aspects, compositions and formulations described herein can have an efficacy against insects of greater than 70% mortality rate, of greater than 75% mortality rate, of greater than 80% mortality rate, of greater than 85% mortality rate, of greater than 90% mortality rate, or of greater than 95% mortality rate. In some further aspects, a percent mortality as described above can be achieved after 15 hrs, 18 hrs, 24, hrs, 48 hrs, or 72 hrs.

II. Methods

The compositions or formulations described herein may be used, for example, to control, eradicate, or prevent insect infestation. In some aspects, compositions or formulations described herein may be used to eradicate mosquitos. Accordingly, aspects of the technology described herein comprises a method for controlling and/or eradicating insects comprising administering a composition or formulation to an area susceptible to or having insects, such as mosquitos.

In some aspects, compositions or formulations described herein can be diluted, for example with water. Compositions or formulations described herein can be diluted at any mix rate not inconsistent with the technical objectives of the present disclosure, for example up to 2 oz/gal, up to 4 oz/gal, up to 6 oz/gal, up to 8/oz/gal, or greater.

In some aspects, the compositions or formulations described herein can be formed into a spray, for example a wide-area space spray or a spot treatment spray. Compositions or formulations described herein, can in some instances, be wide-area space sprays applied via a sprayer or ULV sprayer to control mosquitoes, and other public health pests. In some aspects, the compositions or formulations described herein can be applied via truck, backpack blower, drone, or helicopter. Examples of wide-area spaces include, but are not limited to, urban environments, greenhouses, warehouses, grain storage facilities, stables, farms, food production facilities, agricultural areas, and fields, among others.

In some aspects, compositions and formulations described herein can have an efficacy against insects, for example mosquitos, of up to 70% mortality rate, of up to 80% mortality rate, of up to 90% mortality, or up to 100% mortality rate. In some aspects, compositions and formulations described herein can have an efficacy against insects of greater than 70% mortality rate, of greater than 75% mortality rate, of greater than 80% mortality rate, of greater than 85% mortality rate, of greater than 90% mortality rate, or of greater than 95% mortality rate. In some further aspects, a percent mortality as described above can be achieved after 15 hrs, 18 hrs, 24, hrs, 48 hrs, or 72 hrs.

EXAMPLES

Some embodiments of compositions described herein are further illustrated in the following non-limiting Examples. These Examples illustrate example embodiments and should not be interpreted to encompass the entire breadth of the invention.

The amounts in Tables 1 and 2 refer to the wt. % of each component of the identified composition, based on the total weight of the composition (% w/w). It is to be understood that all components of a given composition add up to 100 weight percent. In the tables, "ATC" stands for Acetyl Tributyl Citrate; "silica" or "silica gel" means precipitated amorphous silica; "SLS" stands for Sodium Lauryl Sulfate; "EO" stands for essential oils; and "UTC" stands for untreated control. Dashes (--) indicate a component is absent (zero weight percent).

TABLE 1

Example Compositions

| Component | Example 1 | Example 2 | Example 3 |
|---|---|---|---|
| Sodium Lauryl Sulfate | 0.70 | 0.70 | 0.5-2.0 |
| Clove Oil | 0.67 | 0.67 | 0.3-1.0 |
| Thyme Oil | 0.67 | 0.67 | 0.3-1.0 |
| Cinnamon Oil | 0.67 | 0.67 | 0.3-1.0 |
| Sesame Oil | 2.00 | 2.00 | 1.0-3.0 |
| Acetyl Tributyl Citrate | 9.00 | 9.00 | 1.0-15.0 |
| Polyglyceryl oleate | 0.60 | 0.60 | — |
| Citric Acid | 0.05 | 0.05 | 0.02-0.06 |
| Silica gel, precipitated | 1.25 | 1.25 | 4.0-9.0 |
| Potassium Sorbate | 0.10 | 0.10 | — |
| Sodium Benzoate | 0.10 | 0.01 | — |
| Glycerin | 8.00 | 8.00 | — |
| Butyl Lactate | — | — | 5.0-15.0 |
| Triglycerol monooleate | — | — | 0.1-2.0 |
| Glyceryl monooleate | — | — | 0.1-2.0 |
| Xanthan Gum | 0.20 | 0.20 | 0.2-0.3 |
| Water | 76.00 | 75.99 | ~60.00 |
| % Control @ 2 oz/gallon | | 85.10% | |
| % Control @ 4 oz/gallon | | 100.00% | |
| % Control @ 8 oz/gallon | | 100.00% | |

With reference to Table 1, Example 2, the efficacy of the composition or formulation is shown against insects (e.g. adult mosquitos) when sprayed at the listed dilution rates. As will be appreciated, the mortality rate of insects is indicated. The findings of Table 1 show that in accordance with some embodiments, an efficacy of greater than 80% and/or up to 100% can be achieved.

For comparison with some embodiments described herein, Comparative Examples were prepared, using the components and amounts shown in Table 2 below. "Comp. Example" in Tables 2 refers to "Comparative Example".

TABLE 2

Comparative Compositions

| Component | Example 4 | Comp. Example 1 | Comp. Example 2 | Comp. Example 3 | Comp. Example 4 |
|---|---|---|---|---|---|
| Cinnamon Oil | 0.30 | — | 0.30 | — | 0.30 |
| Clove Oil | 0.30 | — | 0.30 | — | 0.30 |

TABLE 2-continued

Comparative Compositions

| Component | Example 4 | Comp. Example 1 | Comp. Example 2 | Comp. Example 3 | Comp. Example 4 |
|---|---|---|---|---|---|
| Thyme Oil | 0.30 | — | 0.30 | — | 0.30 |
| Sesame Oil | 0.90 | — | 0.90 | — | 0.90 |
| ATC | 6.00 | 6.00 | — | — | 6.00 |
| Silica | 5.00 | 5.00 | 5.00 | 5.00 | — |
| Polyglycerol Oleate | 1.00 | 1.00 | 1.00 | 1.00 | 1.00 |
| Citric Acid | 0.02 | 0.02 | 0.02 | 0.02 | 0.02 |
| SLS | 1.00 | 1.00 | 1.00 | 1.00 | 1.00 |
| Xanthan Gum | 0.20 | 0.20 | 0.20 | 0.20 | 0.20 |
| Propylene Glycol | 7.88 | 7.88 | 7.88 | 7.88 | 7.88 |
| Potassium Sorbate | 0.10 | 0.10 | 0.10 | 0.10 | 0.10 |
| Butyl Lactate | 6.00 | 6.00 | 6.00 | 6.00 | 6.00 |
| Water | 77.00 | 72.80 | 77.00 | 78.8 | 76.00 |
| % Control @ 2 oz/gallon | 93.20% | 43.90% | 20.70% | 0.00% | 61.70% |
| % Control @ 4 oz/gallon | | | | | |
| % Control @ 8 oz/gallon | 92.10% | | | | |

With reference to Table 2, the efficacy of the composition or formulation is shown against insects (e.g. adult mosquitos) when sprayed at the listed dilution rates. As will be appreciated, the mortality rate of insects is indicated. The findings of Table 2 show that in accordance with some embodiments, an efficacy of greater than 80% and/or greater than 90% can be achieved as compared to the Comparative Examples, which exhibit a much lower efficacy.

Efficacy experiments were carried out to demonstrate the efficacy of the Compositions identified in Table 1 and the Comparative Compositions identified in Table 2. The experimental protocol was carried out as follows: Between 20 and 30 adult mosquitos (either *Aedes aegypti* or *Culex quinquefasciatus*) were added to a 6" diameter cardboard cartridge with tulle mesh, and the cages were placed on poles. Compositions or formulations were applied with a sprayer (STJHL) with a setting of 3 and performed from a distance of 3 feet or 10 feet. The application volume was 1 gal/1000 sq. feet.

TABLE 3

Efficacy of Compositions

| Treatment | Total # Mosquitos Loaded | Total # Mosquitos Dead | % Mortality (18-24 hr) |
|---|---|---|---|
| UTC Water A | 26 | 1 | 2.1% |
| UTC Water B | 21 | 0 | |
| UTC Water A | 18 | 0 | 0.0% |
| UTC Water B | 19 | 0 | |
| Example 4 (2 oz dilution rate) A | 20 | 18 | 93.2% |
| Example 4 (2 oz dilution rate) B | 24 | 23 | |
| Example 4 (8 oz dilution rate) A | 20 | 17 | 92.1% |
| Example 4 (8 oz dilution rate) B | 18 | 18 | |
| Comp. Example 1 (2 oz dilution rate) A | 21 | 9 | 43.9% |
| Comp. Example 1 (2 oz dilution rate) B | 36 | 16 | |
| Comp. Example 2 (2 oz dilution rate) A | 31 | 0 | 20.7% |
| Comp. Example 2 (2 oz dilution rate) B | 27 | 12 | |
| Comp. Example 3 (2 oz dilution rate) A | 31 | 0 | 0.0% |
| Comp. Example 3 (2 oz dilution rate) B | 26 | 0 | |
| Comp. Example 4 (2 oz dilution rate) A | 24 | 16 | 61.7% |
| Comp. Example 4 (2 oz dilution rate) B | 23 | 13 | |

With Reference to Table 3, multiple treatments were administered from a distance of 10 feet, a water rinse was carried out between treatments and the wind speed was about 3 mph. Replications, A and B, are indicated for each treatment.

TABLE 4

Efficacy of Compositions

| Treatment | Total # Mosquitos Loaded | Total # Mosquitos Dead | % Mortality (18-24 hr) |
|---|---|---|---|
| UTC Water A | 21 | 0 | 2.5% |
| UTC Water B | 19 | 1 | |
| Example 2 (2 oz dilution rate) A | 21 | 20 | 95.1% |
| Example 2 (2 oz dilution rate) B | 20 | 19 | |
| Example 2 (8 oz dilution rate) A | 24 | 24 | 100.0% |
| Example 2 (8 oz dilution rate) B | 29 | 29 | |
| UTC Water A | 25 | 2 | 6.7% |
| UTC Water B | 20 | 1 | |
| Example 2 (2 oz dilution rate) A | 21 | 12 | 75.0% |
| Example 2 (2 oz dilution rate) B | 15 | 15 | |
| Example 2 (4 oz dilution rate) A | 21 | 21 | 100.0% |
| Example 2 (4 oz dilution rate) B | 35 | 35 | |
| Example 2 (8 oz dilution rate) A | 29 | 29 | 100.0% |
| Example 2 (8 oz dilution rate) B | 42 | 42 | |

With reference to Table 4, multiple treatments were administered from a distance of 3 feet, a water rinse was carried out between treatments and the wind speed was about 3-9 mph. Replications, A and B, are indicated for each treatment.

Tables 5 and 6 show example mortality rates of mosquitos as a function of time for the indicated composition.

TABLE 5

Efficacy of Compositions

| Test Composition/ Mix Rate | Percent Mortality | | | | |
|---|---|---|---|---|---|
| | Pre-Treatment | 1 hr | 2 hr | 4 hr | 24 hr |
| UTC | 0% | 0% | 0% | 0% | 5% |
| Example 2 (2 oz/gal dilution) | 0% | 10% | 7% | 15% | 100% |
| Example 2 (4 oz/gal dilution) | 0% | 22% | 10% | 18% | 100% |

With reference to Table 5, mortality rates against *Aedes aegypti* (yellow fever mosquitos) were tested. The indicated formulation was applied in two swaths 30" length in 3.75 second spray from a 3' distance using Stihl 2.5 gallon gas powered sprayer flow rate setting 3. The times indicate the time period after application of the composition or formulation.

TABLE 6

Efficacy of Compositions

| Test Composition/ Mix Rate | Pre-Treatment | 1 hr | 2 hr | 4 hr | 24 hr | 48 hr | 72 hr |
|---|---|---|---|---|---|---|---|
| UTC | 0% | 0% | 0% | 0% | 0% | 0% | 3% |
| Example 2 (2 oz/gal dilution) | 0% | 3% | 0% | 0% | 72% | 97% | 97% |
| Example 2 (4 oz/gal dilution) | 0% | 10% | 3% | 8% | 95% | 100% | 100% |

With reference to Table 6, mortality rates against *Culex quinquefasciatus* (southern house mosquitos) were tested. The indicated formulation was applied in two swaths 30" length in 3.75 second spray from a 3' distance using Stihl 2.5 gallon gas powered sprayer flow rate setting 3. The times indicate the time period after application of the composition or formulation.

Additional Example Embodiments

Additional non-limiting example embodiments are provided below.

Embodiment 1. A composition for use as an insecticide comprising: an essential oil component; an Acetyl Tributyl Citrate (ATC) component; and an amorphous precipitated silica component.

Embodiment 2. The composition of Embodiment 1, wherein the essential oil component is present in the composition in an amount of 0.1-10 wt. %, based on the total weight of the composition.

Embodiment 3. The composition of Embodiment 1 or Embodiment 2, wherein the essential oil component comprises at least one of cinnamon oil, clove oil, thyme oil, and/or sesame oil.

Embodiment 4. The composition of any of Embodiments 1-3, wherein the amorphous precipitated silica component is present in the composition in an amount of 1-10 wt. %, based on the total weight of the composition.

Embodiment 5. The composition of any of the preceding embodiments, wherein the ATC component is present in an amount of 1-15 wt. %, based on the total weight of the composition.

Embodiment 6. The composition of any of the preceding embodiments, further comprising a solvent additive component.

Embodiment 7. The composition of any of the preceding embodiments, wherein the solvent additive component is at least one of butyl lactate and/or isopropyl myristate.

Embodiment 8. The composition of any of the preceding embodiments, wherein the composition exhibits greater than 90% efficacy against insects as determined by mortality rate.

Embodiment 9. The composition of any of the preceding embodiments, further comprising an aqueous continuous phase.

Embodiment 10. The composition of any of the preceding embodiments, further comprising one or more buffers.

Embodiment 11. The composition of any of the preceding embodiments, further comprising one or more rheology modifiers.

Embodiment 12. The composition of any of the preceding embodiments, further comprising glycerin.

Embodiment 13. The composition of any of the preceding embodiments, further comprising one or more emulsifiers.

Embodiment 14. The composition of any of the preceding embodiments, wherein the composition does not exhibit phase separation.

Embodiment 15. A method of controlling and/or eradicating insects, the method comprising: providing a composition of any of Embodiments 1-14; and administering the composition to an area containing insects.

Embodiment 16. The method of Embodiment 15, wherein the administering comprises spraying the composition.

Embodiment 17. The method of Embodiments 15 or 16, further comprising diluting the composition with water to form a sprayable preparation.

Embodiment 18. The method of any of Embodiments 15-17, wherein up to 100% mortality rate of insects is achieved at a time period following the administering.

Embodiment 19. The method of any of Embodiments 15-18, wherein greater than 90% mortality rate of insects is achieved at a time period following the administering Embodiment 20. The method of any of Embodiments 15-19, wherein the insect is a mosquito.

Many different arrangements of the various components and/or steps depicted and described, as well as those not shown, are possible without departing from the scope of the claims below. Embodiments of the present technology have been described with the intent to be illustrative rather than restrictive. Alternative embodiments will become apparent from reference to this disclosure. Alternative means of implementing the aforementioned can be completed without departing from the scope of the claims below. Certain features and subcombinations are of utility and can be employed without reference to other features and subcombinations and are contemplated within the scope of the claims and invention.

The invention claimed is:

1. A composition for use as an insecticide comprising:
   an essential oil component, the essential oil component comprising at least one of cinnamon oil, clove oil, thyme oil, and/or sesame oil;
   an Acetyl Tributyl Citrate (ATC) component; and
   an amorphous precipitated silica component,
      wherein the essential oil component is present in the composition in an amount of 0.1-10 wt. %, based on the total weight of the composition,
      wherein the ATC component is present in an amount of 1-15 wt. %, based on the total weight of the composition, and wherein the amorphous precipitated silica component is present in the composition in an amount of 1-10 wt. %, based on the total weight of the composition.

2. The composition of claim 1, further comprising a solvent additive component.

3. The composition of claim 2, wherein the solvent additive component is at least one of butyl lactate and/or isopropyl myristate.

4. The composition of claim 1, wherein the composition exhibits greater than 90% efficacy against insects as determined by mortality rate.

5. The composition of claim 1, further comprising an aqueous continuous phase.

6. The composition of claim 1, further comprising one or more buffers.

7. The composition of claim 1, further comprising one or more rheology modifiers.

8. The composition of claim 1, further comprising glycerin.

9. The composition of claim 1, further comprising one or more emulsifiers.

10. The composition of claim 1, wherein the composition does not exhibit phase separation.

11. A composition comprising:
a first component, the first component being the composition of claim 1; and
a second component, wherein the ratio of the first component to the second component is up to 8 oz./gal.

12. The composition of claim 11, wherein the ratio of the first component to the second component is about 4 oz./gal.

13. The composition of claim 11, wherein the ratio of the first component to the second component is about 2 oz./gal.

14. The composition of claim 11, wherein the second component is water.

15. A method of controlling or eradicating insects, the method comprising:
providing a composition of claim 1; and
administering the composition to an area containing insects.

16. The method of claim 15, wherein the administering comprises spraying the composition.

17. The method of claim 15 further comprising diluting the composition with water to form a sprayable preparation.

18. The method of claim 15, wherein up to 100% mortality rate of insects is achieved at a time period following the administering.

19. The method of claim 15, wherein greater than 90% mortality rate of insects is achieved at a time period following the administering.

20. The method of claim 15, wherein the insect is a mosquito.

* * * * *